(12) United States Patent
Usoro

(10) Patent No.: US 7,422,534 B2
(45) Date of Patent: *Sep. 9, 2008

(54) HYBRID TRANSMISSIONS HAVING THREE MOTOR/GENERATORS AND THREE INTERCONNECTED PLANETARY GEAR SETS

(75) Inventor: Patrick B. Usoro, Troy, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 159 days.

This patent is subject to a terminal disclaimer.

(21) Appl. No.: 11/373,078

(22) Filed: Mar. 10, 2006

(65) Prior Publication Data

US 2007/0093351 A1    Apr. 26, 2007

Related U.S. Application Data

(60) Provisional application No. 60/729,195, filed on Oct. 21, 2005.

(51) Int. Cl.
    *F16H 3/72* (2006.01)
(52) U.S. Cl. .......................................... 475/5
(58) Field of Classification Search ............. 475/5
    See application file for complete search history.

(56) References Cited

U.S. PATENT DOCUMENTS

| 4,270,622 | A  | * | 6/1981  | Travis ..................... 180/65.4 |
|-----------|----|---|---------|---------------------------------------|
| 5,168,946 | A  | * | 12/1992 | Dorgan ..................... 180/6.44 |
| 5,558,595 | A  |   | 9/1996  | Schmidt et al. ............... 477/3  |
| 5,931,757 | A  |   | 8/1999  | Schmidt ....................... 475/2 |
| 6,478,705 | B1 |   | 11/2002 | Holmes et al. ................ 475/5  |
| 6,527,658 | B2 |   | 3/2003  | Holmes et al. ................ 475/5  |
| 6,557,656 | B2 | * | 5/2003  | Haniu et al. ................ 180/65.6 |
| 7,053,566 | B2 | * | 5/2006  | Aizawa et al. ................ 318/34 |
| 7,195,573 | B2 | * | 3/2007  | Bezian et al. ................. 475/5 |
| 2007/0049439 | A1 | * | 3/2007 | Garnett ....................... 475/5  |

* cited by examiner

*Primary Examiner*—Ha D. Ho

(57) ABSTRACT

The electrically variable transmission family of the present invention is a low-content, low-cost electrically variable transmission mechanism including first, second and third differential gear sets, a battery and three electric machines serving interchangeably as motors or generators. The three motor/generators are operable in a coordinated fashion to yield an EVT with a continuously variable range of speeds (including reverse).

14 Claims, 6 Drawing Sheets

Ring Gear/Sun Gear Tooth Ratios:
R1/S1 = 2.33, R2/S2 = 2.52, R3/S3 = 2.93

Ring Gear/Sun Gear Tooth Ratios:
R1/S1 = 2.33, R2/S2 = 2.52, R3/S3 = 2.93

Ring Gear/Sun Gear Tooth Ratios:
R1/S1 = 1.86, R2/S2 = 3.00, R3/S3 = 1.85

Ring Gear/Sun Gear Tooth Ratios:
R1/S1 = 2.80, R2/S2 = 1.93, R3/S3 = 1.89

Ring Gear/Sun Gear Tooth Ratios:
R1/S1 = 2.92, R2/S2 = 2.98, R3/S3 = 2.15

Ring Gear/Sun Gear Tooth Ratios:
R1/S1 = 1.94, R2/S2 = 1.88, R3/S3 = 2.30

Ring Gear/Sun Gear Tooth Ratios:
R1/S1 = 1.91, R2/S2 = 1.58, R3/S3 = 2.53

Ring Gear/Sun Gear Tooth Ratios:
R1/S1 = 2.34, R2/S2 = 2.99, R3/S3 = 2.50

Ring Gear/Sun Gear Tooth Ratios:
R1/S1 = 2.81, R2/S2 = 1.53, R3/S3 = 1.60

Ring Gear/Sun Gear Tooth Ratios:
R1/S1 = 2.80, R2/S2 = 1.93, R3/S3 = 3.02

Ring Gear/Sun Gear Tooth Ratios:
R1/S1 = 1.50, R2/S2 = 2.25, R3/S3 = 3.02

Ring Gear/Sun Gear Tooth Ratios:
R1/S1 = 1.51, R2/S2 = 2.97, R3/S3 = 1.86

Ring Gear/Sun Gear Tooth Ratios:
R1/S1 = 2.33, R2/S2 = 1.68, R3/S3 = 2.70

HYBRID TRANSMISSIONS HAVING THREE MOTOR/GENERATORS AND THREE INTERCONNECTED PLANETARY GEAR SETS

CROSS-REFERENCE TO RELATED APPLICATIONS

This application claims priority to U.S. Provisional Patent Application No. 60/729,195 filed on Oct. 21, 2005, and which is hereby incorporated by reference in its entirety.

TECHNICAL FIELD

The present invention relates to electrically variable transmissions having three planetary gear sets and three motor/generators that are controllable to provide continuously variable speed ratio ranges.

BACKGROUND OF THE INVENTION

Electric hybrid vehicles offer the potential for significant fuel economy improvements over their conventional counterparts; however, their overall efficiency is limited by parasitic losses. In single-mode electric variable transmissions (EVT) these losses are mostly attributed to electric machines rotating at high speeds. Two-mode EVTs offer the advantage of reduced motor-generator speeds, but often suffer losses attributed to high-pressure hydraulic pump and clutches needed for mode switching. Significant vehicle fuel economy gains can be realized if the losses associated with high-pressure hydraulic pump, clutches and high motor-generator speeds are substantially eliminated.

SUMMARY OF THE INVENTION

This invention describes continuously-variable mechatronic hybrid transmissions that offer the advantages of multi-mode EVTs without the need for clutches and the associated high pressure hydraulic pump.

The electrically variable transmission family of the present invention provides low-content, low-cost electrically variable transmission mechanisms including first, second and third differential gear sets, a battery (or similar energy storage device) and three electric machines serving interchangeably as motors or generators. Preferably, the differential gear sets are planetary gear sets, but other gear arrangements may be implemented, such as bevel gears or differential gearing to an offset axis.

In this description, the first, second and third planetary gear sets may be counted first to third in any order (i.e., left to right, right to left, etc.).

Each of the three planetary gear sets has three members. The first, second or third member of each planetary gear set can be any one of a sun gear, ring gear or carrier, or alternatively a pinion.

Each carrier can be either a single-pinion carrier (simple) or a double-pinion carrier (compound).

The input shaft is continuously connected with a member of the planetary gear sets. The output shaft is continuously connected with another member of the planetary gear sets.

A first interconnecting member continuously connects the first member of the first planetary gear set with the first member of the second planetary gear.

A second interconnecting member continuously connects the second member of the first planetary gear set with a first member of the third planetary gear set.

A third interconnecting member continuously connects the second member of the second planetary gear set with a second member of the third planetary gear set.

A first motor/generator is connected to a member of the first or second planetary gear set.

A second motor/generator is connected to a member of the second or third planetary gear set.

A third motor/generator is connected to a member of the first or third planetary gear set.

In essence, the planetary gear arrangement has six nodes, five of which are connected with the input shaft, output shaft and three motor/generators. The electric motor/generators are connected with drive units, control system and energy storage devices, such as a battery.

The three motor/generators are operated in a coordinated fashion to yield continuously variable forward and reverse speed ratios between the input shaft and the output shaft, while minimizing the rotational speeds of the motor-generators and optimizing the overall efficiency of the system. The tooth ratios of the planetary gear sets can be suitably selected to match specific applications.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
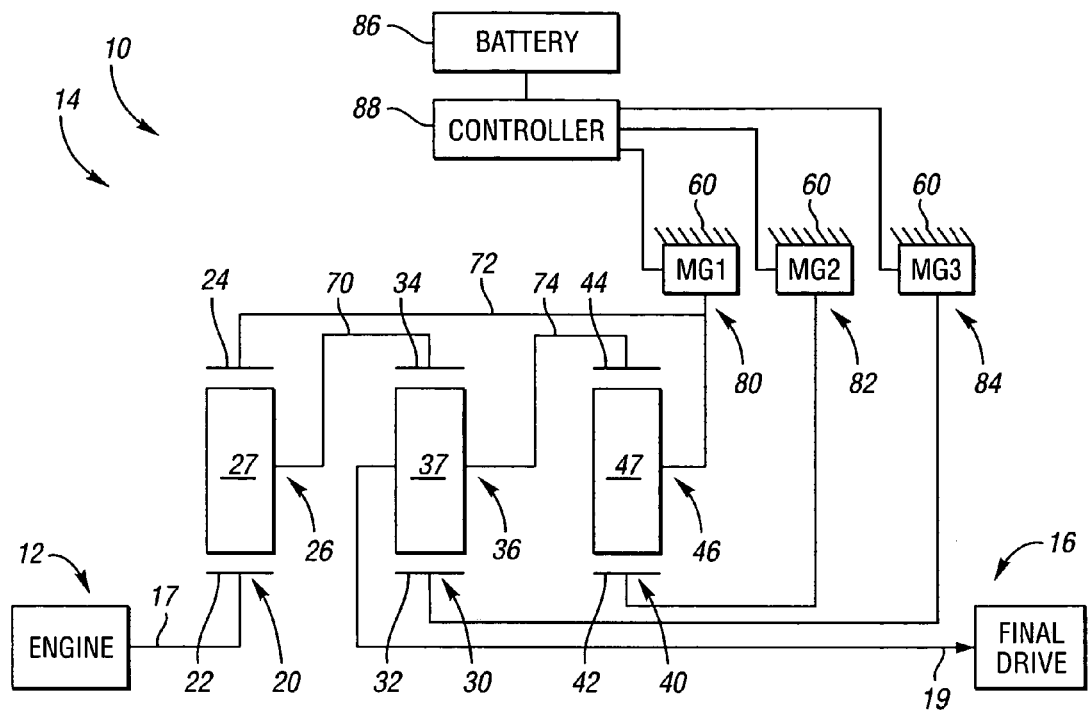
FIG. 1 is a schematic representation of a of a powertrain including a first embodiment of an electrically variable transmission incorporating a family member of the present invention.

With reference to FIG. 1, a powertrain 10 is shown, including an engine 12 connected to one preferred embodiment of the improved electrically variable transmission (EVT), designated generally by the numeral 14. Transmission 14 is designed to receive at least a portion of its driving power from the engine 12. As shown, the engine 12 has an output shaft that serves as the input member 17 of the transmission 14. A transient torque damper (not shown) may also be implemented between the engine 12 and the input member 17 of the transmission.

In the embodiment depicted the engine 12 may be a fossil fuel engine, such as a gasoline or diesel engine which is readily adapted to provide its available power output typically delivered at a selectable number of revolutions per minute (RPM).

Irrespective of the means by which the engine 12 is connected to the transmission input member 17, the transmission input member 17 is operatively connected to a planetary gear set in the transmission 14.

An output member 19 of the transmission 14 is connected to a final drive 16.

The transmission 14 utilizes three differential gear sets, preferably in the nature of planetary gear sets 20, 30 and 40. The planetary gear set 20 employs an outer gear member 24, typically designated as the ring gear. The ring gear member 24 circumscribes an inner gear member 22, typically designated as the sun gear. A carrier member 26 rotatably supports a plurality of planet gears 27 such that each planet gear 27 simultaneously, and meshingly engages both the outer, ring gear member 24 and the inner, sun gear member 22 of the first planetary gear set 20.

The planetary gear set 30 also employs an outer gear member 34, typically designated as the ring gear. The ring gear member 34 circumscribes an inner gear member 32, typically designated as the sun gear. A carrier member 36 rotatably supports a plurality of planet gears 37 such that each planet gear 37 simultaneously, and meshingly engages both the outer, ring gear member 34 and the inner, sun gear member 32 of the planetary gear set 30.

The planetary gear set 40 also employs an outer gear member 44, typically designated as the ring gear. The ring gear member 44 circumscribes an inner gear member 42, typically designated as the sun gear. A carrier member 46 rotatably supports a plurality of planet gears 47 such that each planet gear 47 simultaneously, and meshingly engages both the outer, ring gear member 44 and the inner, sun gear member 42 of the planetary gear set 40.

The input shaft 17 is continuously connected to the sun gear member 22 of the planetary gear set 20. The output shaft 19 is continuously connected to the carrier member 36 of the planetary gear set 30.

A first interconnecting member 70 continuously connects the carrier member 26 of the planetary gear set 20 with the ring gear member 34 of the planetary gear set 30. A second interconnecting member 72 continuously connects the ring gear member 24 of the planetary gear set 20 with the carrier member 46 of the planetary gear set 40. A third interconnecting member 74 continuously connects the carrier member 36 of the planetary gear set 30 with the ring gear member 44 of the planetary gear set 40.

The first preferred embodiment 10 also incorporates first, second and third motor/generators 80, 82 and 84, respectively. The stator of the first motor/generator 80 is secured to the transmission housing 60. The rotor of the first motor/generator 80 is secured to the carrier member 46 of the planetary gear set 40 and the ring gear member 24 of the planetary gear set 20 via interconnecting member 72.

The stator of the second motor/generator 82 is secured to the transmission housing 60. The rotor of the second motor/generator 82 is secured to the sun gear member 42 of the planetary gear set 40.

The stator of the third motor/generator 84 is secured to the transmission housing 60. The rotor of the third motor/generator 84 is secured to the sun gear member 32 of the planetary gear set 30.

Returning now to the description of the power sources, it should be apparent from the foregoing description, and with particular reference to FIG. 1, that the transmission 14 selectively receives power from the engine 12. The hybrid transmission also receives power from an electric power source 86, which is operably connected to a controller 88. The electric power source 86 may be one or more batteries. Other electric power sources, such as capacitors or fuel cells, that have the ability to provide, or store, and dispense electric power may be used in place of or in combination with batteries without altering the concepts of the present invention. The speed ratio between the input shaft and output shaft is prescribed by the speeds of the three motor/generators and the ring gear/sun gear tooth ratios of the planetary gear sets. Those with ordinary skill in the transmission art will recognize that desired input/output speed ratios can be realized by suitable selection of the speeds of the three motor/generators.

Description of a Second Exemplary Embodiment

Figure 2:
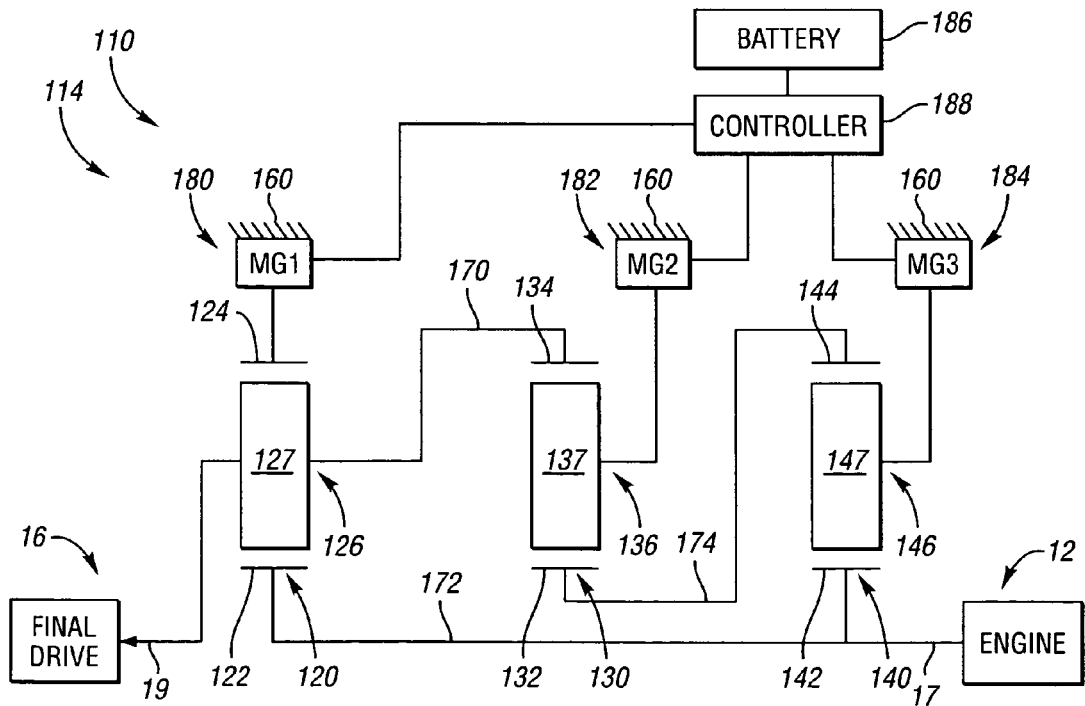
FIG. 2 is a schematic representation of a powertrain including a second embodiment of an electrically variable transmission incorporating a family member of the present invention.

With reference to FIG. 2, a powertrain 110 is shown, including an engine 12 connected to another embodiment of the improved electrically variable transmission (EVT), designated generally by the numeral 114. Transmission 114 is designed to receive at least a portion of its driving power from the engine 12. As shown, the engine 12 has an output shaft that serves as the input member 17 of the transmission 114. A transient torque damper (not shown) may also be implemented between the engine 12 and the input member 17 of the transmission.

In the embodiment depicted the engine 12 may be a fossil fuel engine, such as a gasoline or diesel engine which is readily adapted to provide its available power output typically delivered at a selectable number of revolutions per minute (RPM).

Irrespective of the means by which the engine 12 is connected to the transmission input member 17, the transmission input member 17 is operatively connected to a planetary gear set in the transmission 114.

An output member 19 of the transmission 114 is connected to a final drive 16.

The transmission 114 utilizes three differential gear sets, preferably in the nature of planetary gear sets 120, 130 and 140. The planetary gear set 120 employs an outer gear member 124, typically designated as the ring gear. The ring gear member 124 circumscribes an inner gear member 122, typically designated as the sun gear. A carrier member 126 rotatably supports a plurality of planet gears 127 such that each planet gear 127 simultaneously, and meshingly engages both the outer, ring gear member 124 and the inner, sun gear member 122 of the first planetary gear set 120.

The planetary gear set 130 also employs an outer gear member 134, typically designated as the ring gear. The ring gear member 134 circumscribes an inner gear member 132, typically designated as the sun gear. A carrier member 136 rotatably supports a plurality of planet gears 137 such that each planet gear 137 simultaneously, and meshingly engages both the outer, ring gear member 134 and the inner, sun gear member 132 of the planetary gear set 130.

The planetary gear set 140 also employs an outer gear member 144, typically designated as the ring gear. The ring gear member 144 circumscribes an inner gear member 142, typically designated as the sun gear. A carrier member 146 rotatably supports a plurality of planet gears 147 such that each planet gear 147 simultaneously, and meshingly engages both the outer, ring gear member 144 and the inner, sun gear member 142 of the planetary gear set 140.

The input shaft 17 is continuously connected to the sun gear member 142 of the planetary gear set 140. The output shaft 19 is continuously connected to the carrier member 126 of the planetary gear set 120.

A first interconnecting member 170 continuously connects the carrier member 126 of the planetary gear set 120 with the ring gear member 134 of the planetary gear set 130. A second interconnecting member 172 continuously connects the sun gear member 122 of the planetary gear set 120 with the sun gear member 142 of the planetary gear set 140. A third interconnecting member 174 continuously connects the sun gear member 132 of the planetary gear set 130 with the ring gear member 144 of the planetary gear set 140.

The second preferred embodiment 110 also incorporates first, second and third motor/generators 180, 182 and 184, respectively. The stator of the first motor/generator 180 is secured to the transmission housing 160. The rotor of the first motor/generator 180 is secured to the ring gear member 124 of the planetary gear set 120.

The stator of the second motor/generator 182 is secured to the transmission housing 160. The rotor of the second motor/generator 182 is secured to the carrier member 136 of the planetary gear set 130.

The stator of the third motor/generator 184 is secured to the transmission housing 160. The rotor of the third motor/generator 184 is secured to the carrier member 146 of the planetary gear set 140.

The hybrid transmission 114 receives power from the engine 12, and also exchanges power with an electric power source 186, which is operably connected to a controller 188.

Description of a Third Exemplary Embodiment

Figure 3:
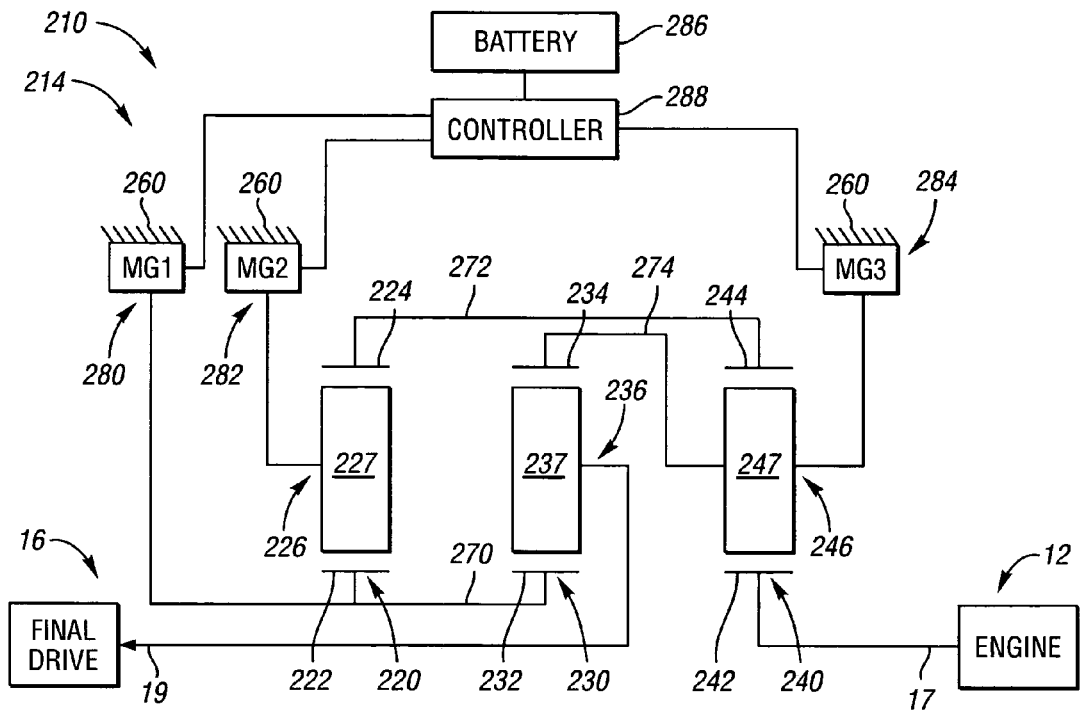
FIG. 3 is a schematic representation of a powertrain including a third embodiment of an electrically variable transmission incorporating a family member of the present invention.

With reference to FIG. 3, a powertrain 210 is shown, including an engine 12 connected to another embodiment of the improved electrically variable transmission (EVT), designated generally by the numeral 214. Transmission 214 is designed to receive at least a portion of its driving power from the engine 12. As shown, the engine 12 has an output shaft that serves as the input member 17 of the transmission 214. A transient torque damper (not shown) may also be implemented between the engine 12 and the input member 17 of the transmission.

In the embodiment depicted the engine 12 may be a fossil fuel engine, such as a gasoline or diesel engine which is readily adapted to provide its available power output typically delivered at a selectable number of revolutions per minute (RPM).

Irrespective of the means by which the engine 12 is connected to the transmission input member 17, the transmission input member 17 is operatively connected to a planetary gear set in the transmission 214.

An output member 19 of the transmission 214 is connected to a final drive 16.

The transmission 214 utilizes three differential gear sets, preferably in the nature of planetary gear sets 220, 230 and 240. The planetary gear set 220 employs an outer gear member 224, typically designated as the ring gear. The ring gear member 224 circumscribes an inner gear member 222, typically designated as the sun gear. A carrier member 226 rotatably supports a plurality of planet gears 227 such that each planet gear 227 simultaneously, and meshingly engages both the outer, ring gear member 224 and the inner, sun gear member 222 of the first planetary gear set 220.

The planetary gear set 230 also employs an outer gear member 234, typically designated as the ring gear. The ring gear member 234 circumscribes an inner gear member 232, typically designated as the sun gear. A carrier member 236 rotatably supports a plurality of planet gears 237 such that each planet gear 237 simultaneously, and meshingly engages both the outer, ring gear member 234 and the inner, sun gear member 232 of the planetary gear set 230.

The planetary gear set 240 also employs an outer gear member 244, typically designated as the ring gear. The ring gear member 244 circumscribes an inner gear member 242, typically designated as the sun gear. A carrier member 246 rotatably supports a plurality of planet gears 247 such that each planet gear 247 simultaneously, and meshingly engages both the outer, ring gear member 244 and the inner, sun gear member 242 of the planetary gear set 240.

The input shaft 17 is continuously connected to the sun gear member 242 of the planetary gear set 240. The output shaft 19 is continuously connected to the carrier member 236 of the planetary gear set 230.

A first interconnecting member 270 continuously connects the sun gear member 222 with the sun gear member 232. A second interconnecting member 272 continuously connects the ring gear member 224 with the ring gear member 244. A third interconnecting member 274 continuously connects the ring gear member 234 with the carrier 246.

The preferred embodiment 210 also incorporates first, second and third motor/generators 280, 282 and 284, respectively. The stator of the first motor/generator 280 is secured to the transmission housing 260. The rotor of the first motor/generator 280 is secured to the sun gear member 222 of the planetary gear set 240.

The stator of the second motor/generator 282 is secured to the transmission housing 260. The rotor of the second motor/generator 282 is secured to the carrier member 226 of the planetary gear set 220.

The stator of the third motor/generator 284 is secured to the transmission housing 260. The rotor of the third motor/generator 284 is secured to the carrier member 246 of the planetary gear set 240.

The hybrid transmission 214 receives power from the engine 12, and also exchanges power with an electric power source 286, which is operably connected to a controller 288.

Description of a Fourth Exemplary Embodiment

Figure 4:
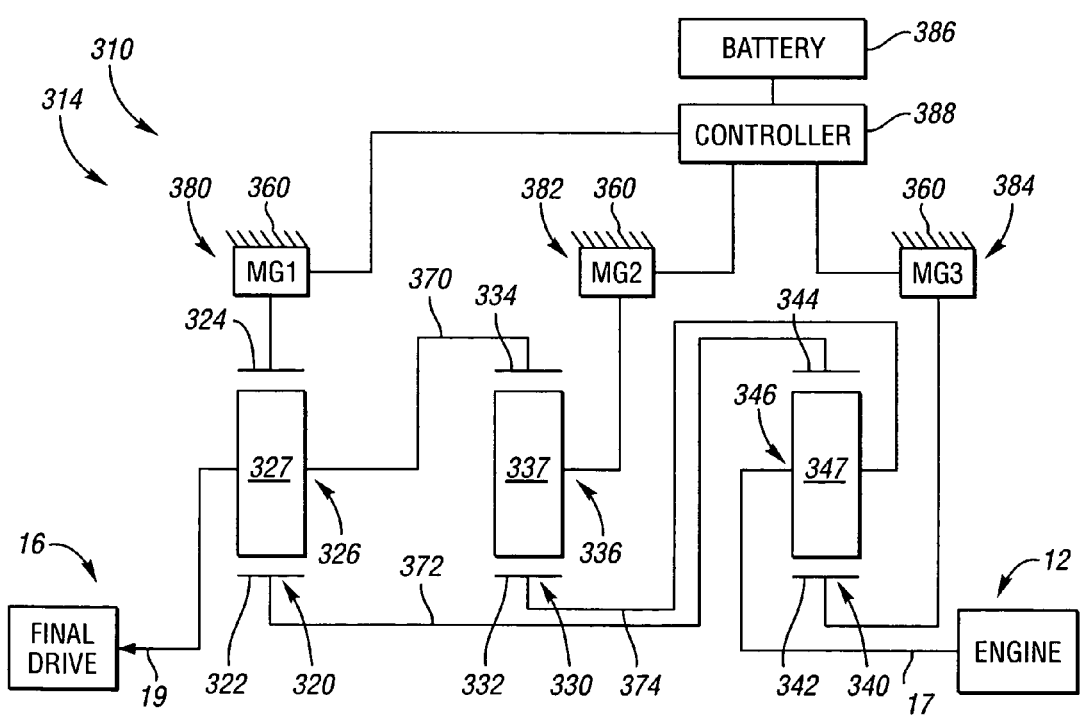
FIG. 4 is a schematic representation of a powertrain including a fourth embodiment of an electrically variable transmission incorporating a family member of the present invention.

With reference to FIG. 4, a powertrain 310 is shown, including an engine 12 connected to another embodiment of the improved electrically variable transmission (EVT), designated generally by the numeral 314. Transmission 314 is designed to receive at least a portion of its driving power from the engine 12. As shown, the engine 12 has an output shaft that serves as the input member 17 of the transmission 314. A transient torque damper (not shown) may also be implemented between the engine 12 and the input member 17 of the transmission.

In the embodiment depicted the engine 12 may be a fossil fuel engine, such as a gasoline or diesel engine which is readily adapted to provide its available power output typically delivered at a selectable number of revolutions per minute (RPM).

Irrespective of the means by which the engine 12 is connected to the transmission input member 17, the transmission input member 17 is operatively connected to a planetary gear set in the transmission 14. An output member 19 of the transmission 314 is connected to a final drive 16.

The transmission 314 utilizes three differential gear sets, preferably in the nature of planetary gear sets 320, 330 and 340. The planetary gear set 320 employs an outer gear member 324, typically designated as the ring gear. The ring gear member 324 circumscribes an inner gear member 322, typically designated as the sun gear. A carrier member 326 rotatably supports a plurality of planet gears 327 such that each planet gear 327 simultaneously, and meshingly engages both the outer, ring gear member 324 and the inner, sun gear member 322 of the first planetary gear set 320.

The planetary gear set 330 also employs an outer gear member 334, typically designated as the ring gear. The ring gear member 334 circumscribes an inner gear member 332, typically designated as the sun gear. A carrier member 336 rotatably supports a plurality of planet gears 337 such that each planet gear 337 simultaneously, and meshingly engages both the outer, ring gear member 334 and the inner, sun gear member 332 of the planetary gear set 330.

The planetary gear set 340 also employs an outer gear member 344, typically designated as the ring gear. The ring gear member 344 circumscribes an inner gear member 342, typically designated as the sun gear. A carrier member 346 rotatably supports a plurality of planet gears 347 such that each planet gear 347 simultaneously, and meshingly engages both the outer, ring gear member 344 and the inner, sun gear member 342 of the planetary gear set 340.

The input shaft 17 is continuously connected to the carrier member 346 of the planetary gear set 340. The output shaft 19 is continuously connected to the carrier member 326 of the planetary gear set 320.

A first interconnecting member 370 continuously connects the carrier member 326 with the ring gear member 334. A second interconnecting member 372 continuously connects the sun gear member 322 with the ring gear member 344. A third interconnecting member 374 continuously connects the sun gear member 332 with the carrier member 346.

The preferred embodiment 310 also incorporates first, second and third motor/generators 380, 382 and 384, respectively. The stator of the first motor/generator 380 is secured to the transmission housing 360. The rotor of the first motor/generator 380 is secured to the ring gear member 324.

The stator of the second motor/generator 382 is secured to the transmission housing 360. The rotor of the second motor/generator 382 is secured to the carrier member 336.

The stator of the third motor/generator 384 is secured to the transmission housing 360. The rotor of the third motor/generator 384 is secured to the sun gear member 342.

The hybrid transmission 314 receives power from the engine 12, and also exchanges power with an electric power source 386, which is operably connected to a controller 388.

Description of a Fifth Exemplary Embodiment

Figure 5:
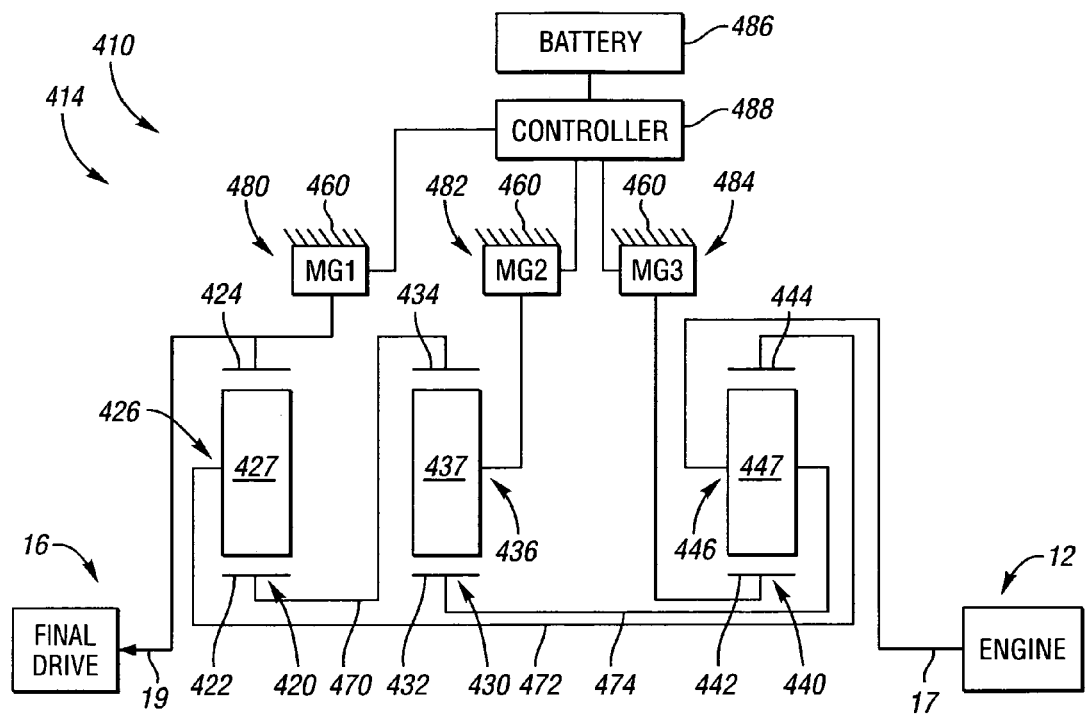
FIG. 5 is a schematic representation of a powertrain including a fifth embodiment of an electrically variable transmission incorporating a family member of the present invention.

With reference to FIG. 5, a powertrain 410 is shown, including an engine 12 connected to another embodiment of the improved electrically variable transmission (EVT), designated generally by the numeral 414. Transmission 414 is designed to receive at least a portion of its driving power from the engine 12. As shown, the engine 12 has an output shaft that serves as the input member 17 of the transmission 414. A transient torque damper (not shown) may also be implemented between the engine 12 and the input member 17 of the transmission.

In the embodiment depicted the engine 12 may be a fossil fuel engine, such as a gasoline or diesel engine which is readily adapted to provide its available power output typically delivered at a selectable number of revolutions per minute (RPM).

Irrespective of the means by which the engine 12 is connected to the transmission input member 17, the transmission input member 17 is operatively connected to a planetary gear set in the transmission 414. An output member 19 of the transmission 414 is connected to a final drive 16.

The transmission 414 utilizes three differential gear sets, preferably in the nature of planetary gear sets 420, 430 and 440. The planetary gear set 420 employs an outer gear member 424, typically designated as the ring gear. The ring gear member 424 circumscribes an inner gear member 422, typically designated as the sun gear. A carrier member 426 rotatably supports a plurality of planet gears 427 such that each planet gear 427 simultaneously, and meshingly engages both the outer, ring gear member 424 and the inner, sun gear member 422 of the first planetary gear set 420.

The planetary gear set 430 also employs an outer gear member 434, typically designated as the ring gear. The ring gear member 434 circumscribes an inner gear member 432, typically designated as the sun gear. A carrier member 436 rotatably supports a plurality of planet gears 437 such that each planet gear 437 simultaneously, and meshingly engages both the outer, ring gear member 434 and the inner, sun gear member 432 of the planetary gear set 430.

The planetary gear set 440 also employs an outer gear member 444, typically designated as the ring gear. The ring gear member 444 circumscribes an inner gear member 442, typically designated as the sun gear. A carrier member 446 rotatably supports a plurality of planet gears 447 such that each planet gear 447 simultaneously, and meshingly engages both the outer, ring gear member 444 and the inner, sun gear member 442 of the planetary gear set 440.

The input shaft 17 is continuously connected to the carrier member 446. The output shaft 19 is continuously connected to the ring gear member 424.

A first interconnecting member 470 continuously connects the sun gear member 422 with the ring gear member 434. A second interconnecting member 472 continuously connects the carrier member 426 with the ring gear member 444. A third interconnecting member 474 continuously connects the sun gear member 432 with the carrier member 446.

The preferred embodiment 410 also incorporates first, second and third motor/generators 480, 482 and 484, respectively. The stator of the first motor/generator 480 is secured to the transmission housing 460. The rotor of the first motor/generator 480 is secured to the ring gear member 424, and therefore the output member 19.

The stator of the second motor/generator 482 is secured to the transmission housing 460. The rotor of the second motor/generator 482 is secured to the carrier member 436.

The stator of the third motor/generator 484 is secured to the transmission housing 460. The rotor of the third motor/generator 484 is secured to the sun gear member 442.

The hybrid transmission 414 receives power from the engine 12, and also exchanges power with an electric power source 486, which is operably connected to a controller 488.

Description of a Sixth Exemplary Embodiment

Figure 6:
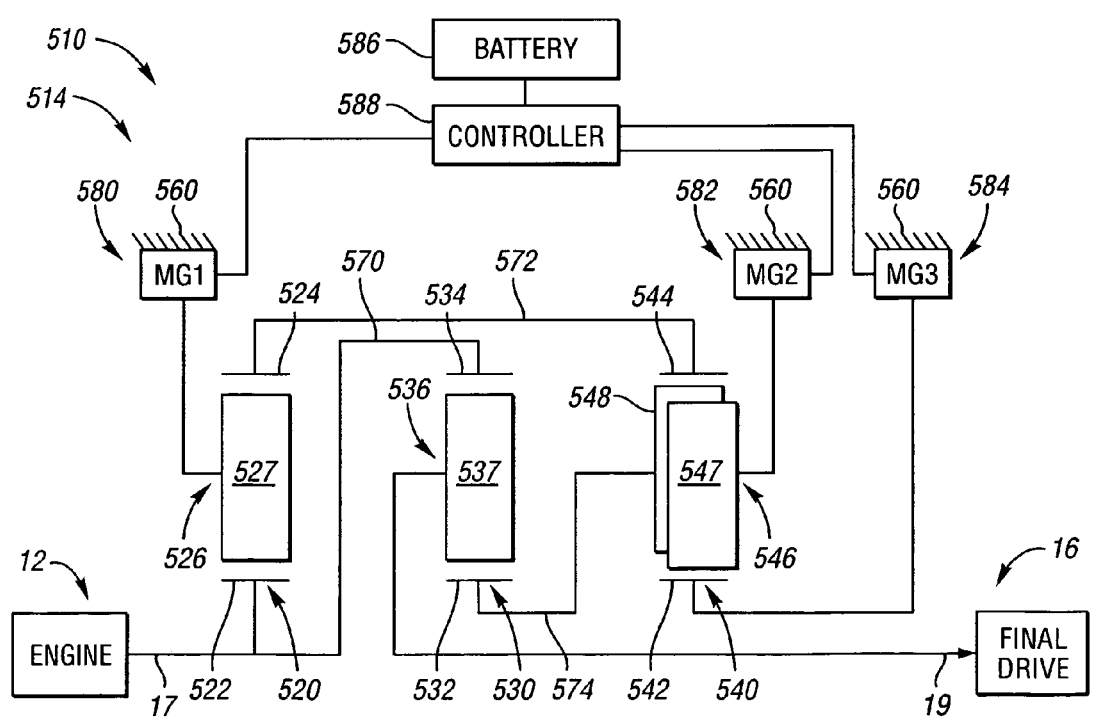
FIG. 6 is a schematic representation of a powertrain including a sixth embodiment of an electrically variable transmission incorporating a family member of the present invention.

With reference to FIG. 6, a powertrain 510 is shown, including an engine 12 connected to another embodiment of the improved electrically variable transmission (EVT), designated generally by the numeral 514. Transmission 514 is designed to receive at least a portion of its driving power from the engine 12. As shown, the engine 12 has an output shaft that serves as the input member 17 of the transmission 514. A transient torque damper (not shown) may also be implemented between the engine 12 and the input member 17 of the transmission.

In the embodiment depicted the engine 12 may be a fossil fuel engine, such as a gasoline or diesel engine which is readily adapted to provide its available power output typically delivered at a selectable number of revolutions per minute (RPM).

Irrespective of the means by which the engine 12 is connected to the transmission input member 17, the transmission input member 17 is operatively connected to a planetary gear set in the transmission 514. An output member 19 of the transmission 514 is connected to a final drive 16.

The transmission 514 utilizes three differential gear sets, preferably in the nature of planetary gear sets 520, 530 and 540. The planetary gear set 520 employs an outer gear member 524, typically designated as the ring gear. The ring gear member 524 circumscribes an inner gear member 522, typically designated as the sun gear. A carrier member 526 rotatably supports a plurality of planet gears 527 such that each planet gear 527 simultaneously, and meshingly engages both the outer, ring gear member 524 and the inner, sun gear member 522 of the planetary gear set 520.

The planetary gear set 530 also employs an outer gear member 534, typically designated as the ring gear. The ring gear member 534 circumscribes an inner gear member 532, typically designated as the sun gear. A carrier member 536 rotatably supports a plurality of planet gears 537 such that each planet gear 537 simultaneously, and meshingly engages both the outer, ring gear member 534 and the inner, sun gear member 532 of the planetary gear set 530.

The planetary gear set 540 also employs an outer gear member 544, typically designated as the ring gear. The ring gear member 544 circumscribes an inner gear member 542, typically designated as the sun gear. A carrier member 546 rotatably supports a plurality of planet gears 547, 548. Each planet gear 547 meshingly engages the sun gear member 542 and each planet gear 548 simultaneously, and meshingly engages both the ring gear member 544 and the respective planet gear 547.

The input shaft 17 is continuously connected to the sun gear member 522. The output shaft 19 is continuously connected to the carrier member 536.

A first interconnecting member 570 continuously connects the sun gear member 522 with the ring gear member 534. A second interconnecting member 572 continuously connects the ring gear member 524 with the ring gear member 544. A third interconnecting member 574 continuously connects the sun gear member 532 with the carrier member 546.

The preferred embodiment 510 also incorporates first, second and third motor/generators 580, 582 and 584, respectively. The stator of the first motor/generator 580 is secured to the transmission housing 560. The rotor of the first motor/generator 580 is secured to the carrier member 526.

The stator of the second motor/generator 582 is secured to the transmission housing 560. The rotor of the second motor/generator 582 is secured to the carrier member 546.

The stator of the third motor/generator 584 is secured to the transmission housing 560. The rotor of the third motor/generator 584 is secured to the sun gear member 542.

The hybrid transmission 514 receives power from the engine 12, and also exchanges power with an electric power source 586, which is operably connected to a controller 588.

Description of a Seventh Exemplary Embodiment

Figure 7:
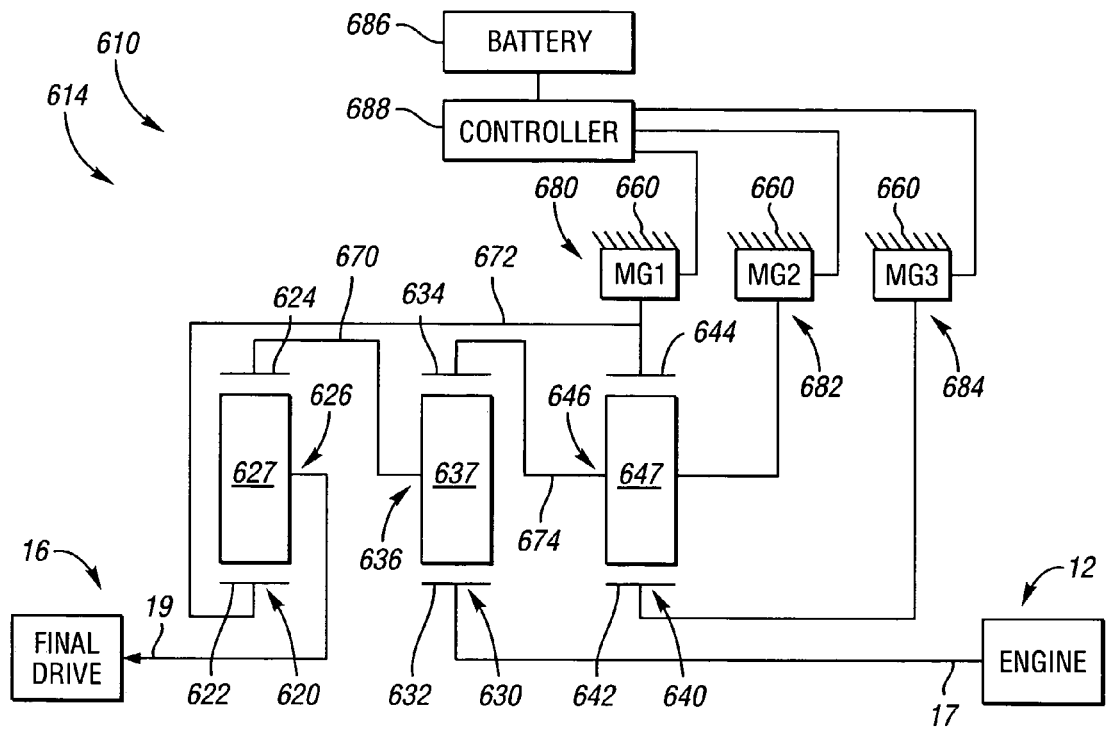
FIG. 7 is a schematic representation of a powertrain including a seventh embodiment of an electrically variable transmission incorporating a family member of the present invention.

With reference to FIG. 7, a powertrain 610 is shown, including an engine 12 connected to another embodiment of the improved electrically variable transmission (EVT), designated generally by the numeral 614. Transmission 614 is designed to receive at least a portion of its driving power from the engine 12. As shown, the engine 12 has an output shaft that serves as the input member 17 of the transmission 614. A transient torque damper (not shown) may also be implemented between the engine 12 and the input member 17 of the transmission.

In the embodiment depicted the engine 12 may be a fossil fuel engine, such as a gasoline or diesel engine which is readily adapted to provide its available power output typically delivered at a selectable number of revolutions per minute (RPM).

Irrespective of the means by which the engine 12 is connected to the transmission input member 17, the transmission input member 17 is operatively connected to a planetary gear set in the transmission 614. An output member 19 of the transmission 614 is connected to a final drive 16.

The transmission 614 utilizes three differential gear sets, preferably in the nature of planetary gear sets 620, 630 and 640. The planetary gear set 620 employs an outer gear member 624, typically designated as the ring gear. The ring gear member 624 circumscribes an inner gear member 622, typically designated as the sun gear. A carrier member 626 rotatably supports a plurality of planet gears 627 such that each planet gear 627 simultaneously, and meshingly engages both the outer, ring gear member 624 and the inner, sun gear member 622 of the first planetary gear set 620.

The planetary gear set 630 also employs an outer gear member 634, typically designated as the ring gear. The ring gear member 634 circumscribes an inner gear member 632, typically designated as the sun gear. A carrier member 636 rotatably supports a plurality of planet gears 637 such that each planet gear 637 simultaneously, and meshingly engages both the outer, ring gear member 634 and the inner, sun gear member 632 of the planetary gear set 630.

The planetary gear set 640 also employs an outer gear member 644, typically designated as the ring gear. The ring gear member 644 circumscribes an inner gear member 642, typically designated as the sun gear. A carrier member 646 rotatably supports a plurality of planet gears 647 such that each planet gear 647 simultaneously, and meshingly engages both the outer, ring gear member 644 and the inner, sun gear member 642 of the planetary gear set 640.

The input shaft 17 is continuously connected to the sun gear member 632. The output shaft 19 is continuously connected to the carrier member 626.

A first interconnecting member 670 continuously connects the ring gear member 624 with the carrier member 636. A second interconnecting member 672 continuously connects the sun gear member 622 with the ring gear member 644. A third interconnecting member 674 continuously connects the ring gear member 634 with the carrier member 646.

The preferred embodiment 610 also incorporates first, second and third motor/generators 680, 682 and 684, respectively. The stator of the first motor/generator 680 is secured to the transmission housing 660. The rotor of the first motor/generator 680 is secured to the ring gear member 644 and to the sun gear member 622 via the interconnecting member 672.

The stator of the second motor/generator 682 is secured to the transmission housing 660. The rotor of the second motor/generator 682 is secured to the carrier member 646.

The stator of the third motor/generator 684 is secured to the transmission housing 660. The rotor of the third motor/generator 684 is secured to the sun gear member 642.

The hybrid transmission 614 receives power from the engine 12, and also exchanges power with an electric power source 686, which is operably connected to a controller 688.

Description of an Eighth Exemplary Embodiment

Figure 8:
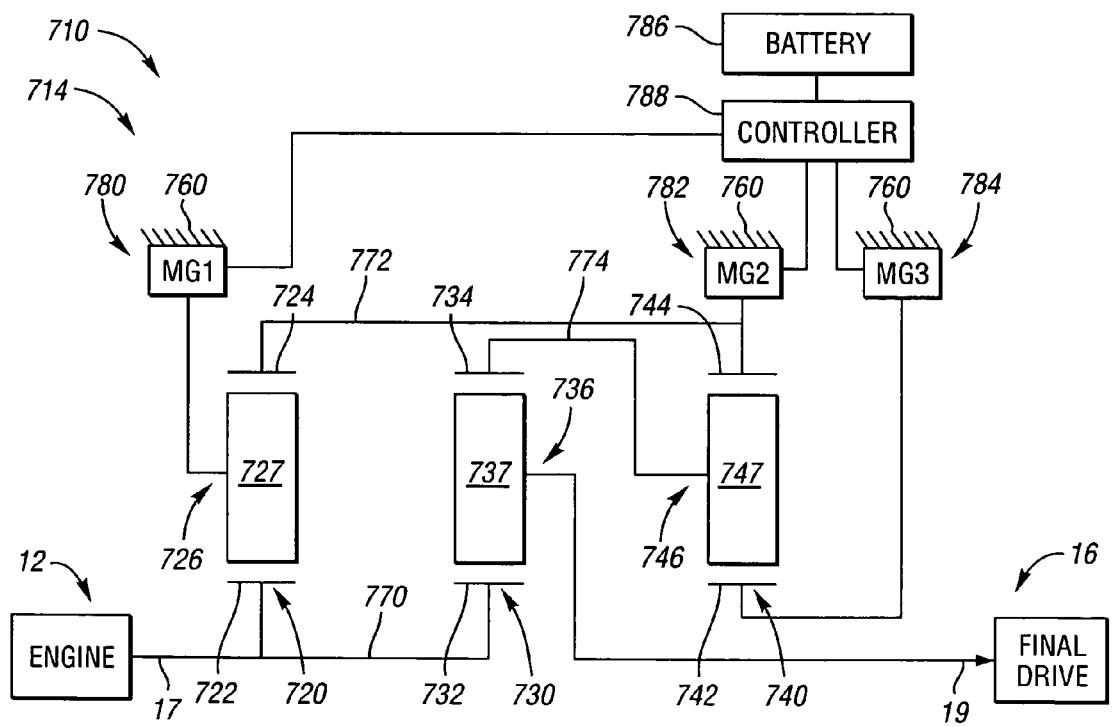
FIG. 8 is a schematic representation of a powertrain including an eighth embodiment of an electrically variable transmission incorporating a family member of the present invention.

With reference to FIG. 8, a powertrain 710 is shown, including an engine 12 connected to another embodiment of the improved electrically variable transmission (EVT), designated generally by the numeral 714. Transmission 714 is designed to receive at least a portion of its driving power from the engine 12. As shown, the engine 12 has an output shaft that serves as the input member 17 of the transmission 714. A transient torque damper (not shown) may also be implemented between the engine 12 and the input member 17 of the transmission.

In the embodiment depicted the engine 12 may be a fossil fuel engine, such as a gasoline or diesel engine which is readily adapted to provide its available power output typically delivered at a selectable number of revolutions per minute (RPM).

Irrespective of the means by which the engine 12 is connected to the transmission input member 17, the transmission input member 17 is operatively connected to a planetary gear set in the transmission 714. An output member 19 of the transmission 714 is connected to a final drive 16.

The transmission 714 utilizes three differential gear sets, preferably in the nature of planetary gear sets 720, 730 and 740. The planetary gear set 720 employs an outer gear member 724, typically designated as the ring gear. The ring gear member 724 circumscribes an inner gear member 722, typically designated as the sun gear. A carrier member 726 rotatably supports a plurality of planet gears 727 such the each planet gear 727 simultaneously, and meshingly engages both the outer, ring gear member 724 and the inner, sun gear member 722 of the planetary gear set 720.

The planetary gear set 730 also employs an outer gear member 734, typically designated as the ring gear. The ring gear member 734 circumscribes an inner gear member 732, typically designated as the sun gear. A carrier member 736 rotatably supports a plurality of planet gears 737 such that each planet gear 737 simultaneously, and meshingly engages both the outer, ring gear member 734 and the inner, sun gear member 732 of the planetary gear set 730.

The planetary gear set 740 also employs an outer gear member 744, typically designated as the ring gear. The ring gear member 744 circumscribes an inner gear member 742, typically designated as the sun gear. A carrier member 746 rotatably supports a plurality of planet gears 747 such that each planet gear 747 simultaneously, and meshingly engages both the outer, ring gear member 744 and the inner, sun gear member 742 of the planetary gear set 740.

The input shaft 17 is continuously connected to the sun gear member 722. The output shaft 19 is continuously connected to the carrier member 736.

A first interconnecting member 770 continuously connects the sun gear member 722 with the sun gear member 732. A second interconnecting member 772 continuously connects the ring gear member 724 with the ring gear member 744. A third interconnecting member 774 continuously connects the ring gear member 734 with the carrier member 746.

The preferred embodiment 710 also incorporates first, second and third motor/generators 780, 782 and 784, respectively. The stator of the first motor/generator 780 is secured to the transmission housing 760. The rotor of the first motor/generator 780 is secured to the carrier member 726.

The stator of the second motor/generator 782 is secured to the transmission housing 760. The rotor of the second motor/generator 782 is secured to the ring gear member 744.

The stator of the third motor/generator 784 is secured to the transmission housing 760. The rotor of the third motor/generator 784 is secured to the sun gear member 742.

The hybrid transmission 714 receives power from the engine 12, and also exchanges power with an electric power source 786, which is operably connected to a controller 788.

Description of a Ninth Exemplary Embodiment

Figure 9:
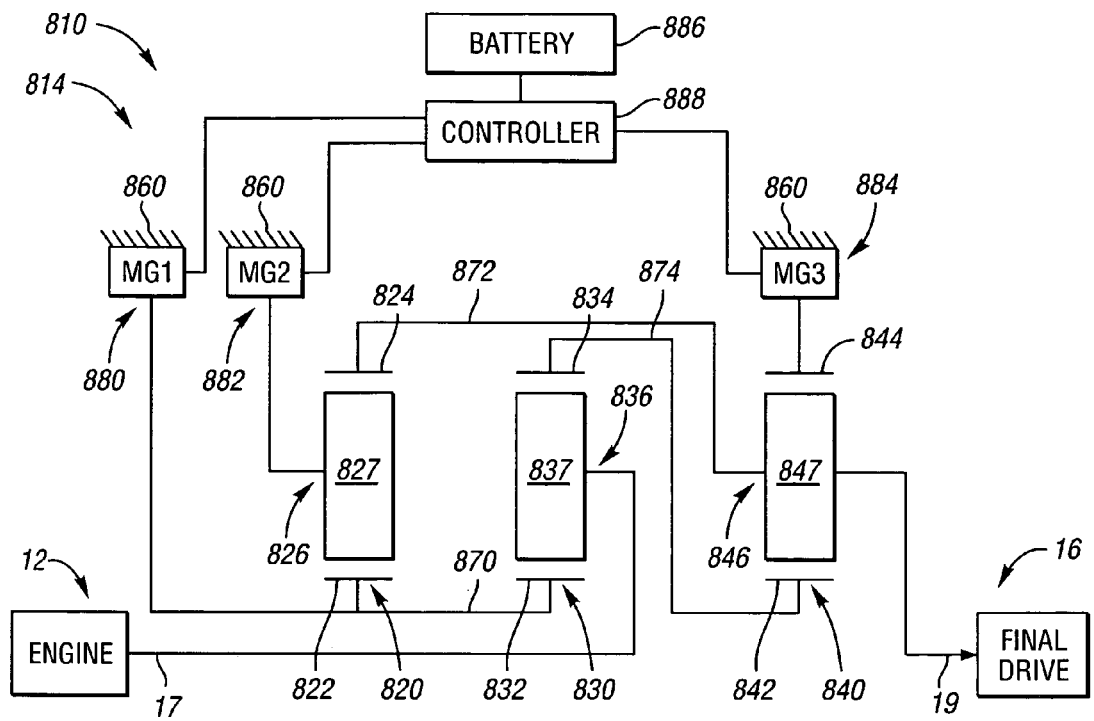
FIG. 9 is a schematic representation of a powertrain including a ninth embodiment of an electrically variable transmission incorporating a family member of the present invention.

With reference to FIG. 9, a powertrain 810 is shown, including an engine 12 connected to another embodiment of the improved electrically variable transmission (EVT), designated generally by the numeral 814. Transmission 814 is designed to receive at least a portion of its driving power from the engine 12. As shown, the engine 12 has an output shaft that serves as the input member 17 of the transmission 814. A transient torque damper (not shown) may also be implemented between the engine 12 and the input member 17 of the transmission.

In the embodiment depicted the engine 12 may be a fossil fuel engine, such as a gasoline or diesel engine which is readily adapted to provide its available power output typically delivered at a selectable number of revolutions per minute (RPM).

Irrespective of the means by which the engine 12 is connected to the transmission input member 17, the transmission input member 17 is operatively connected to a planetary gear set in the transmission 814. An output member 19 of the transmission 814 is connected to a final drive 16.

The transmission 814 utilizes three differential gear sets, preferably in the nature of planetary gear sets 820, 830 and 840. The planetary gear set 820 employs an outer gear member 824, typically designated as the ring gear. The ring gear member 824 circumscribes an inner gear member 822, typically designated as the sun gear. A carrier member 826 rotatably supports a plurality of planet gears 827 such that each planet gear 827 simultaneously, and meshingly engages both the outer, ring gear member 824 and the inner, sun gear member 822 of the planetary gear set 820.

The planetary gear set 830 also employs an outer gear member 834, typically designated as the ring gear. The ring gear member 834 circumscribes an inner gear member 832, typically designated as the sun gear. A carrier member 836 rotatably supports a plurality of planet gears 837 such that each planet gear 837 simultaneously, and meshingly engages both the outer, ring gear member 834 and the inner, sun gear member 832 of the planetary gear set 830.

The planetary gear set 840 also employs an outer gear member 844, typically designated as the ring gear. The ring gear member 844 circumscribes an inner gear member 842, typically designated as the sun gear. A carrier member 846 rotatably supports a plurality of planet gears 847 such that each planet gear 847 simultaneously, and meshingly engages both the outer, ring gear member 844 and the inner, sun gear member 842 of the planetary gear set 840.

The input shaft 17 is continuously connected to the carrier member 836. The output shaft 19 is continuously connected to the carrier member 846.

A first interconnecting member 870 continuously connects the sun gear member 822 with sun gear member 832. A second interconnecting member 872 continuously connects the ring gear member 824 with the carrier member 846. A third interconnecting member 874 continuously connects the ring gear member 834 with the sun gear member 842.

The preferred embodiment 810 also incorporates first, second and third motor/generators 880, 882 and 884, respectively. The stator of the first motor/generator 880 is secured to the transmission housing 860. The rotor of the first motor/generator 880 is secured to the sun gear member 822.

The stator of the second motor/generator 882 is secured to the transmission housing 860. The rotor of the second motor/generator 882 is secured to the carrier member 826.

The stator of the third motor/generator 884 is secured to the transmission housing 860. The rotor of the third motor/generator 884 is secured to the ring gear member 844.

The hybrid transmission 814 receives power from the engine 12, and also exchanges power with an electric power source 886, which is operably connected to a controller 888.

Description of a Tenth Exemplary Embodiment

Figure 10:
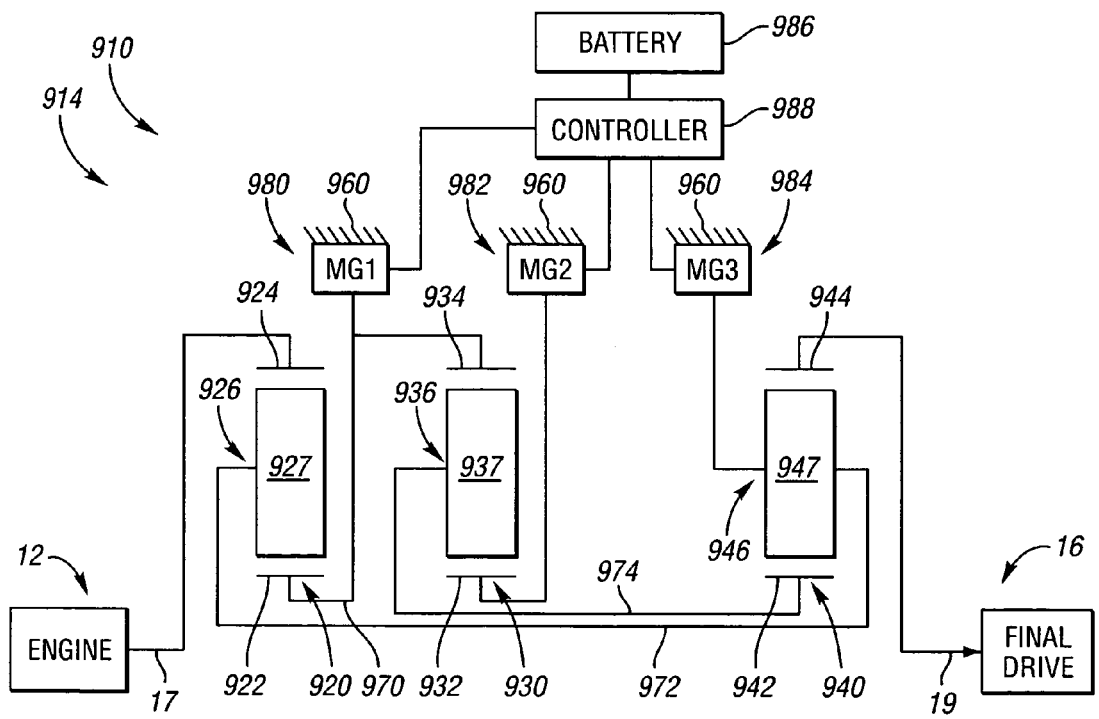
FIG. 10 is a schematic representation of a powertrain including a tenth embodiment of an electrically variable transmission incorporating a family member of the present invention.

With reference to FIG. 10, a powertrain 910 is shown, including an engine 12 connected to another embodiment of the improved electrically variable transmission (EVT), designated generally by the numeral 914. Transmission 914 is designed to receive at least a portion of its driving power from the engine 12. As shown, the engine 12 has an output shaft that serves as the input member 17 of the transmission 914. A transient torque damper (not shown) may also be implemented between the engine 12 and the input member 17 of the transmission.

In the embodiment depicted the engine 12 may be a fossil fuel engine, such as a gasoline or diesel engine which is readily adapted to provide its available power output typically delivered at a selectable number of revolutions per minute (RPM).

Irrespective of the means by which the engine 12 is connected to the transmission input member 17, the transmission input member 17 is operatively connected to a planetary gear set in the transmission 914. An output member 19 of the transmission 914 is connected to a final drive 16.

The transmission 914 utilizes three differential gear sets, preferably in the nature of planetary gear sets 920, 930 and 940. The planetary gear set 920 employs an outer gear member 924, typically designated as the ring gear. The ring gear member 924 circumscribes an inner gear member 922, typically designated as the sun gear. A carrier member 926 rotatably supports a plurality of planet gears 927 such that each planet gear 927 simultaneously, and meshingly engages both the outer, ring gear member 924 and the inner, sun gear member 922 of the planetary gear set 920.

The planetary gear set 930 employs an outer gear member 934, typically designated as the ring gear. The ring gear member 934 circumscribes an inner gear member 932, typically designated as the sun gear. A carrier member 936 rotatably supports a plurality of planet gears 937 such that each planet gear 937 simultaneously, and meshingly engages both the outer, ring gear member 934 and the inner, sun gear member 932 of the planetary gear set 930.

The planetary gear set 940 employs an outer gear member 944, typically designated as the ring gear. The ring gear member 944 circumscribes an inner gear member 942, typically designated as the sun gear. A carrier member 946 rotatably supports a plurality of planet gears 947 such that each planet gear 947 simultaneously, and meshingly engages both the outer, ring gear member 944 and the inner, sun gear member 942 of the planetary gear set 940.

The input shaft 17 is continuously connected to the ring gear member 924. The output shaft 19 is continuously connected to the ring gear member 944.

A first interconnecting member 970 continuously connects the sun gear member 922 with the ring gear member 934. A second interconnecting member 972 continuously connects the carrier member 926 with the carrier member 946. A third interconnecting member 974 continuously connects the carrier member 936 with the sun gear member 942.

The preferred embodiment 910 also incorporates first, second and third motor/generators 980, 982 and 984, respectively. The stator of the first motor/generator 980 is secured to the transmission housing 960. The rotor of the first motor/generator 980 is secured to the ring gear member 934 and to the sun gear member 922 via the interconnecting member 970.

The stator of the second motor/generator 982 is secured to the transmission housing 960. The rotor of the second motor/generator 982 is secured to the sun gear member 932.

The stator of the third motor/generator 984 is secured to the transmission housing 960. The rotor of the third motor/generator 984 is secured to the carrier member 946.

The hybrid transmission 914 receives power from the engine 12, and also exchanges power with an electric power source 986, which is operably connected to a controller 988.

Description of an Eleventh Exemplary Embodiment

Figure 11:
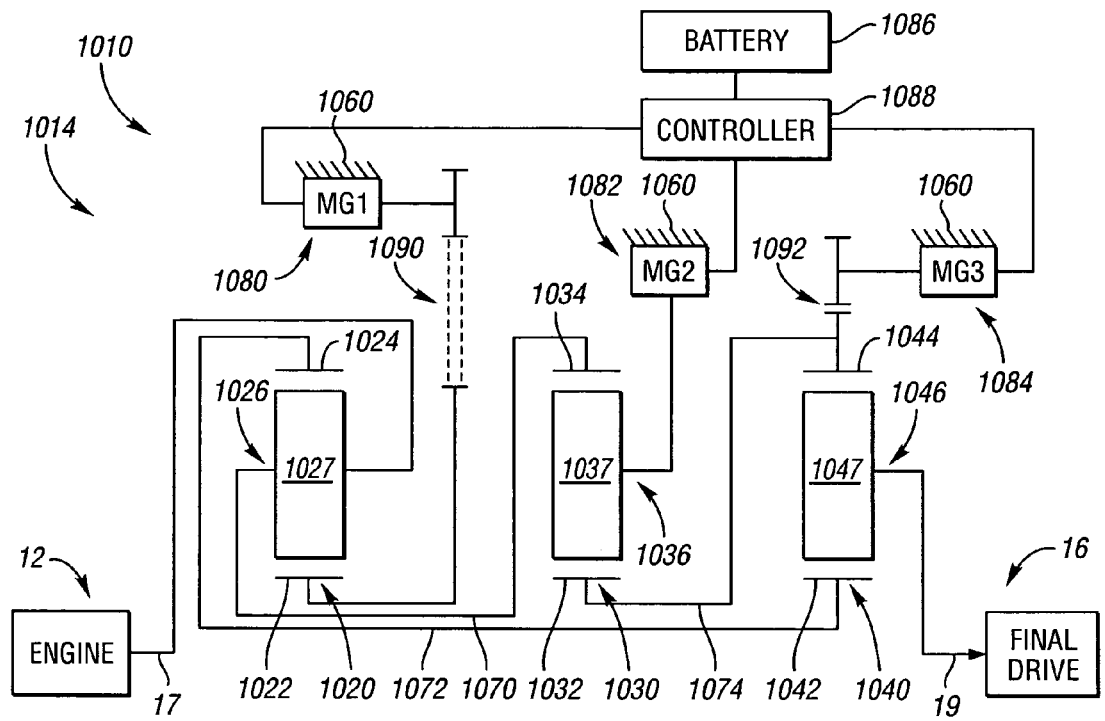
FIG. 11 is a schematic representation of a powertrain including a eleventh embodiment of an electrically variable transmission incorporating a family member of the present invention.

With reference to FIG. 11, a powertrain 1010 is shown, including an engine 12 connected to another embodiment of the improved electrically variable transmission (EVT), designated generally by the numeral 1014. Transmission 1014 is designed to receive at least a portion of its driving power from the engine 12. As shown, the engine 12 has an output shaft that serves as the input member 17 of the transmission 1014. A transient torque damper (not shown) may also be implemented between the engine 12 and the input member 17 of the transmission.

In the embodiment depicted the engine 12 may be a fossil fuel engine, such as a gasoline or diesel engine which is readily adapted to provide its available power output typically delivered at a selectable number of revolutions per minute (RPM).

Irrespective of the means by which the engine 12 is connected to the transmission input member 17, the transmission input member 17 is operatively connected to a planetary gear set in the transmission 1014. An output member 19 of the transmission 1014 is connected to a final drive 16.

The transmission 1014 utilizes three differential gear sets, preferably in the nature of planetary gear sets 1020, 1030 and 1040. The planetary gear set 1020 employs an outer gear member 1024, typically designated as the ring gear. The ring gear member 1024 circumscribes an inner gear member 1022, typically designated as the sun gear. A carrier member 1026 rotatably supports a plurality of planet gears 1027 such that each planet gear 1027 simultaneously, and meshingly engages both the outer, ring gear member 1024 and the inner, sun gear member 1022 of the planetary gear set 1020.

The planetary gear set 1030 also employs an outer gear member 1034, typically designated as the ring gear. The ring gear member 1034 circumscribes an inner gear member 1032, typically designated as the sun gear. A carrier member 1036 rotatably supports a plurality of planet gears 1037 such that each planet gear 1037 simultaneously, and meshingly engages both the outer, ring gear member 1034 and the inner, sun gear member 1032 of the planetary gear set 1030.

The planetary gear set 1040 also employs an outer gear member 1044, typically designated as the ring gear. The ring gear member 1044 circumscribes an inner gear member 1042, typically designated as the sun gear. A carrier member 1046 rotatably supports a plurality of planet gears 1047 such that each planet gear 1047 simultaneously, and meshingly engages both the outer, ring gear member 1044 and the inner, sun gear member 1042 of the planetary gear set 1040.

The input shaft 17 is continuously connected to the carrier member 1026. The output shaft 19 is continuously connected to the carrier member 1046.

A first interconnecting member 1070 continuously connects the carrier member 1026 with the ring gear member 1034. A second interconnecting member 1072 continuously connects the ring gear member 1024 with the sun gear member 1042. A third interconnecting member 1074 continuously connects the sun gear member 1032 with the ring gear member 1044.

The preferred embodiment 1010 also incorporates first, second and third motor/generators 1080, 1082 and 1084, respectively. The stator of the first motor/generator 1080 is secured to the transmission housing 1060. The rotor of the first motor/generator 1080 is secured to the sun gear member 1022 via an offset drive 1090, such as a belt or chain, which may change the speed ratio.

The stator of the second motor/generator 1082 is secured to the transmission housing 1060. The rotor of the second motor/generator 1082 is secured to the carrier member 1036.

The stator of the third motor/generator 1084 is secured to the transmission housing 1060. The rotor of the third motor/generator 1084 is secured to the ring gear member 1044 via offset gear 1092, which may change the speed ratio.

The hybrid transmission 1014 receives power from the engine 12, and also exchanges power with an electric power source 1086, which is operably connected to a controller 1088.

Description of a Twelfth Exemplary Embodiment

Figure 12:
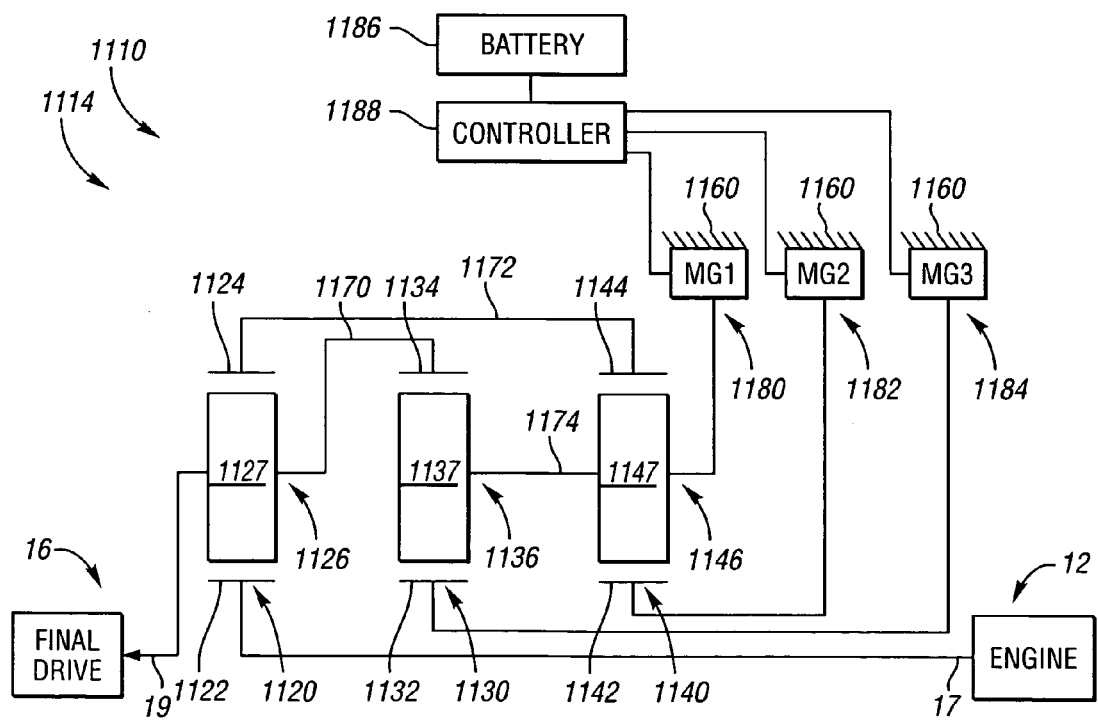
FIG. 12 is a schematic representation of a powertrain including a twelfth embodiment of an electrically variable transmission incorporating a family member of the present invention.

With reference to FIG. 12, a powertrain 1110 is shown, including an engine 12 connected to another embodiment of the improved electrically variable transmission (EVT), designated generally by the numeral 1114. Transmission 1114 is designed to receive at least a portion of its driving power from the engine 12. As shown, the engine 12 has an output shaft that serves as the input member 17 of the transmission 1114. A transient torque damper (not shown) may also be implemented between the engine 12 and the input member 17 of the transmission.

In the embodiment depicted the engine 12 may be a fossil fuel engine, such as a gasoline or diesel engine which is readily adapted to provide its available power output typically delivered at a selectable number of revolutions per minute (RPM).

Irrespective of the means by which the engine 12 is connected to the transmission input member 17, the transmission input member 17 is operatively connected to a planetary gear set in the transmission 1114. An output member 19 of the transmission 1114 is connected to a final drive 16.

The transmission 1114 utilizes three differential gear sets, preferably in the nature of planetary gear sets 1120, 1130 and 1140. The planetary gear set 1120 employs an outer gear member 1124, typically designated as the ring gear. The ring gear member 1124 circumscribes an inner gear member 1122, typically designated as the sun gear. A carrier member 1126 rotatably supports a plurality of planet gears 1127 such that each planet gear 1127 simultaneously, and meshingly engages both the outer, ring gear member 1124 and the inner, sun gear member 1122 of the planetary gear set 1120.

The planetary gear set 1130 employs an outer gear member 1134, typically designated as the ring gear. The ring gear member 1134 circumscribes an inner gear member 1132, typically designated as the sun gear. A carrier member 1136 rotatably supports a plurality of planet gears 1137 such that each planet gear 1137 simultaneously, and meshingly engages both the outer, ring gear member 1134 and the inner, sun gear member 1132 of the planetary gear set 1130.

The planetary gear set 1140 employs an outer gear member 1144, typically designated as the ring gear. The ring gear member 1144 circumscribes an inner gear member 1142, typically designated as the sun gear. A carrier member 1146 rotatably supports a plurality of planet gears 1147 such that each planet gear 1147 simultaneously, and meshingly engages both the outer, ring gear member 1144 and the inner, sun gear member 1142 of the planetary gear set 1140.

The input shaft 17 is continuously connected to the sun gear member 1122. The output shaft 19 is continuously connected to the carrier member 1126.

A first interconnecting member 1170 continuously connects the carrier member 1126 with the ring gear member 1134. A second interconnecting member 1172 continuously connects the ring gear member 1124 with the ring gear member 1144. A third interconnecting member 1174 continuously connects the carrier member 1136 with the carrier member 1146.

The preferred embodiment 1110 also incorporates first, second and third motor/generators 1180, 1182 and 1184, respectively. The stator of the first motor/generator 1180 is secured to the transmission housing 1160. The rotor of the first motor/generator 1180 is secured to the carrier member 1146.

The stator of the second motor/generator 1182 is secured to the transmission housing 1160. The rotor of the second motor/generator 1182 is secured to the sun gear member 1142.

The stator of the third motor/generator 1184 is secured to the transmission housing 1160. The rotor of the third motor/generator 1184 is secured to the sun gear member 1132.

The hybrid transmission 1114 receives power from the engine 12, and also exchanges power with an electric power source 1186, which is operably connected to a controller 1188.

While the best modes for carrying out the invention have been described in detail, those familiar with the art to which this invention relates will recognize various alternative designs and embodiments for practicing the invention within the scope of the appended claims.

The invention claimed is:

1. An electrically variable transmission comprising:
   an input member drivingly connected to an engine to receive power directly from the engine;

an output member;

first, second and third motor/generators;

first, second and third differential gear sets each having first, second and third members;

said input member being continuously connected with a member of said gear sets, and said output member being continuously connected with another member of said gear sets;

a first interconnecting member continuously connecting said first member of said first gear set with said first member of said second gear set;

a second interconnecting member continuously connecting said second member of said first gear set with said first member of said third gear set;

a third interconnecting member continuously connecting said second member of said second gear set with said second member of said third gear set;

said first motor/generator being continuously connected with a member of said first or second gear set;

said second motor/generator being continuously connected with a member of said second or third gear set;

said third motor/generator being continuously connected with a member of said first or third gear set;

wherein said first, second and third motor/generators are operable in a coordinated fashion to provide an electrically variable transmission with a continuously variable range of speed ratios between said input member and said output member.

2. The electrically variable transmission of claim 1, wherein said first, second and third differential gear sets are planetary gear sets.

3. The electrically variable transmission of claim 2, wherein carriers of each of said planetary gear sets are single-pinion carriers.

4. The electrically variable transmission of claim 2, wherein at least one carrier of said planetary gear sets is a double-pinion carrier.

5. The electrically variable transmission of claim 1, wherein at least one of said motor/generators is connected with said gear sets through a fixed or variable speed ratio device, wherein the fixed or variable speed ratio device is a conventional gear set, a belt drive, a chain drive or combinations thereof.

6. The electrically variable transmission of claim 1, wherein the electrically variable transmission is characterized by the absence of clutches.

7. The electrically variable transmission of claim 1, wherein at least one of said motor/generators is connected with said input member or said output member.

8. The electrically variable transmission of claim 1, wherein said third members of said first, second and third differential gear sets are not interconnected with another member of said first, second and third differential gear sets.

9. An electrically variable transmission comprising:

an input member drivingly connected to an engine to receive power directly from the engine;

an output member;

first, second and third motor/generators;

first, second and third differential gear sets each having first, second and third members;

said input member being continuously connected with a member of said gear sets, and said output member being continuously connected with another member of said gear sets;

a first interconnecting member continuously connecting said first member of said first gear set with said first member of said second gear set;

a second interconnecting member continuously connecting said second member of said first gear set with said first member of said third gear set;

a third interconnecting member continuously connecting said second member of said second gear set with said second member of said third gear set;

said first, second and third motor/generators being continuously connected with members of said gear sets;

wherein said first, second and third motor/generators are operable in a coordinated fashion to provide an electrically variable transmission with a continuously variable range of speed ratios between said input member and said output member.

10. The electrically variable transmission of claim 9, wherein said first, second and third differential gear sets are planetary gear sets.

11. The electrically variable transmission of claim 10, wherein carriers of each of said planetary gear sets are single-pinion carriers.

12. The electrically variable transmission of claim 10, wherein at least one carrier of said planetary gear sets is a double-pinion carrier.

13. The electrically variable transmission of claim 9, wherein at least one of said motor/generators is connected with said gear sets through a fixed or variable speed ratio device, wherein the fixed or variable speed ratio device is a conventional gear set, a belt drive, a chain drive or combinations thereof.

14. The electrically variable transmission of claim 9, wherein said third members of said first, second and third differential gear sets are not interconnected with another member of said first, second and third differential gear sets.

* * * * *